Aug. 26, 1924.
J. TYDINGS
1,506,394
APPARATUS TO MECHANICALLY HARNESS, STORE, AND TRANSMIT POWER
Filed Nov. 15, 1921     7 Sheets-Sheet 1
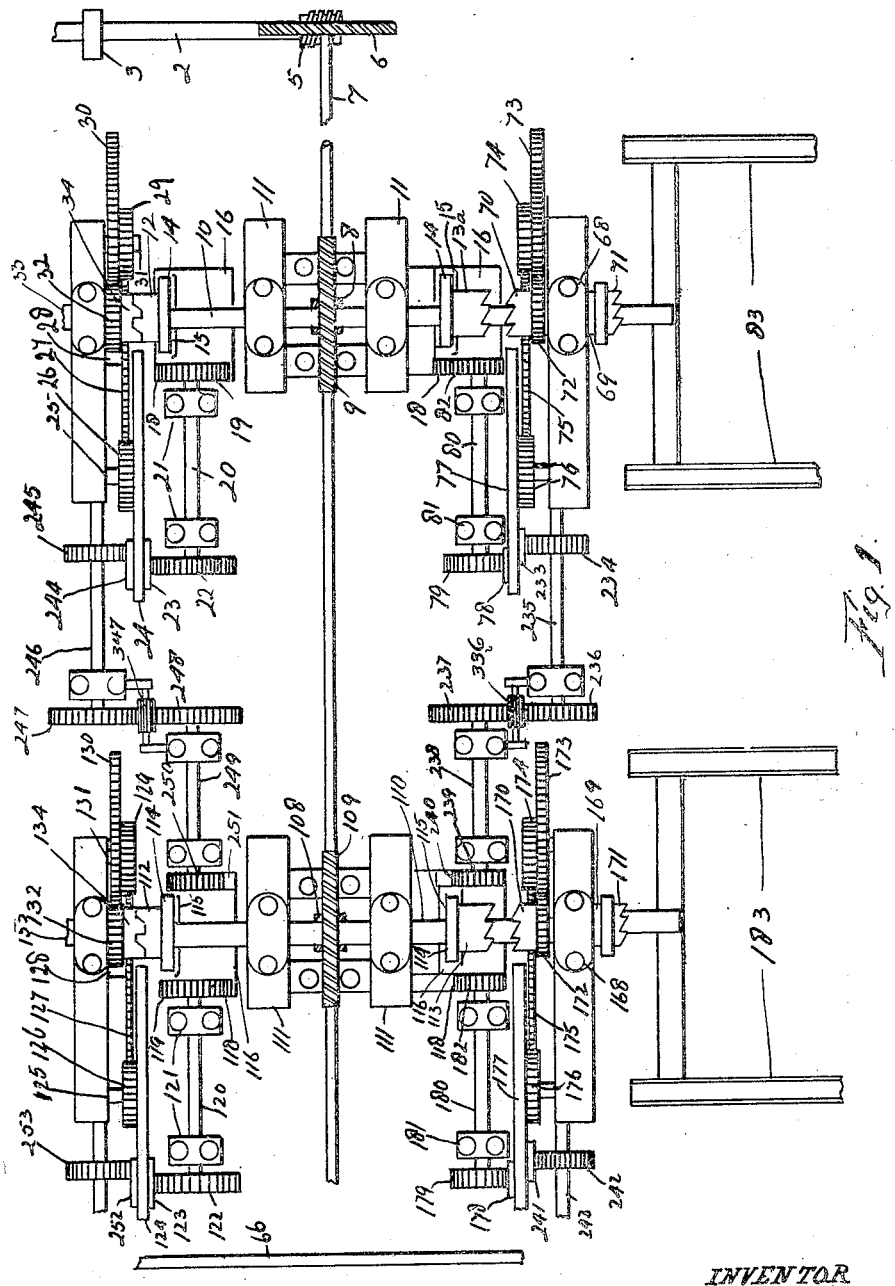
INVENTOR
John Tydings
By W. W. Williamson, Atty.

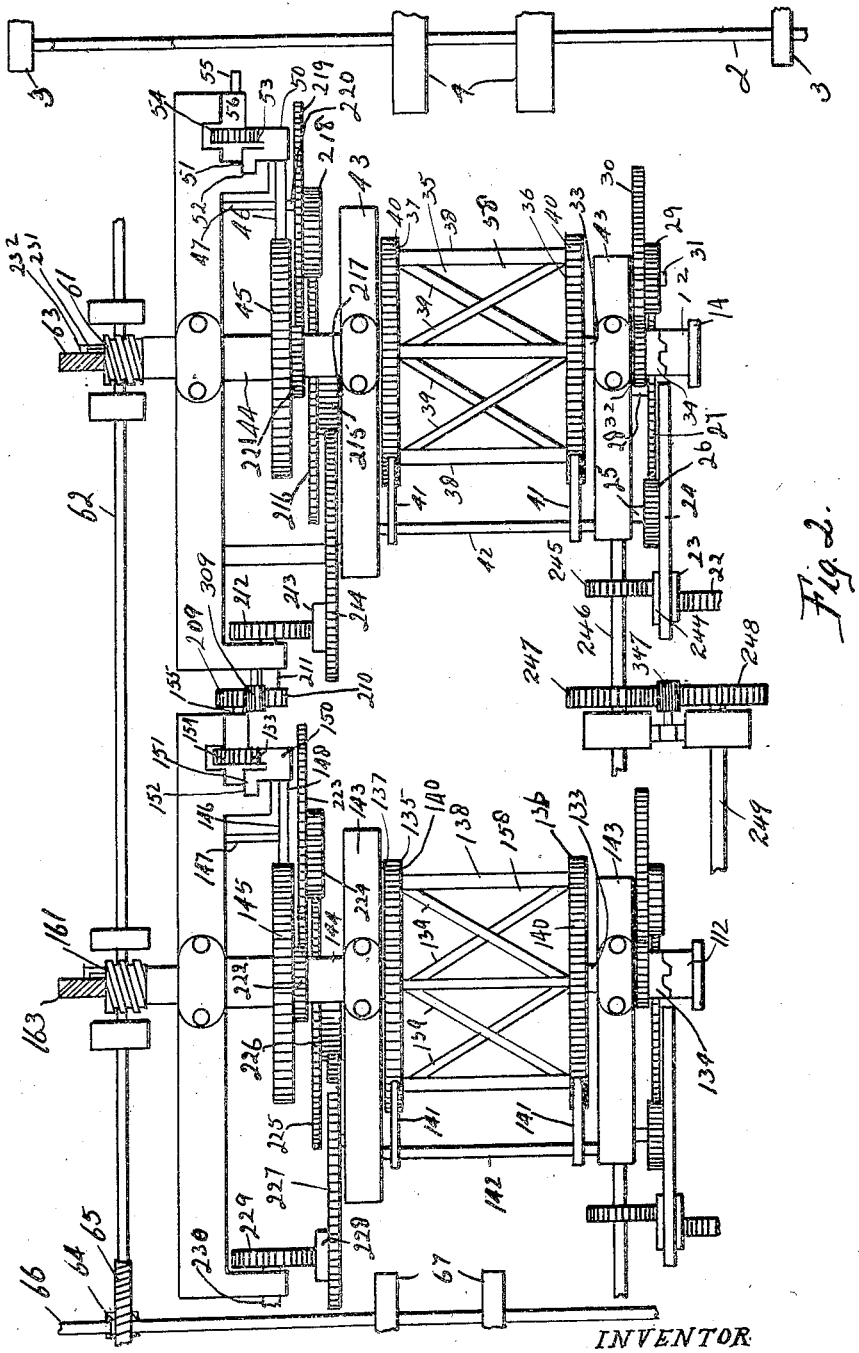

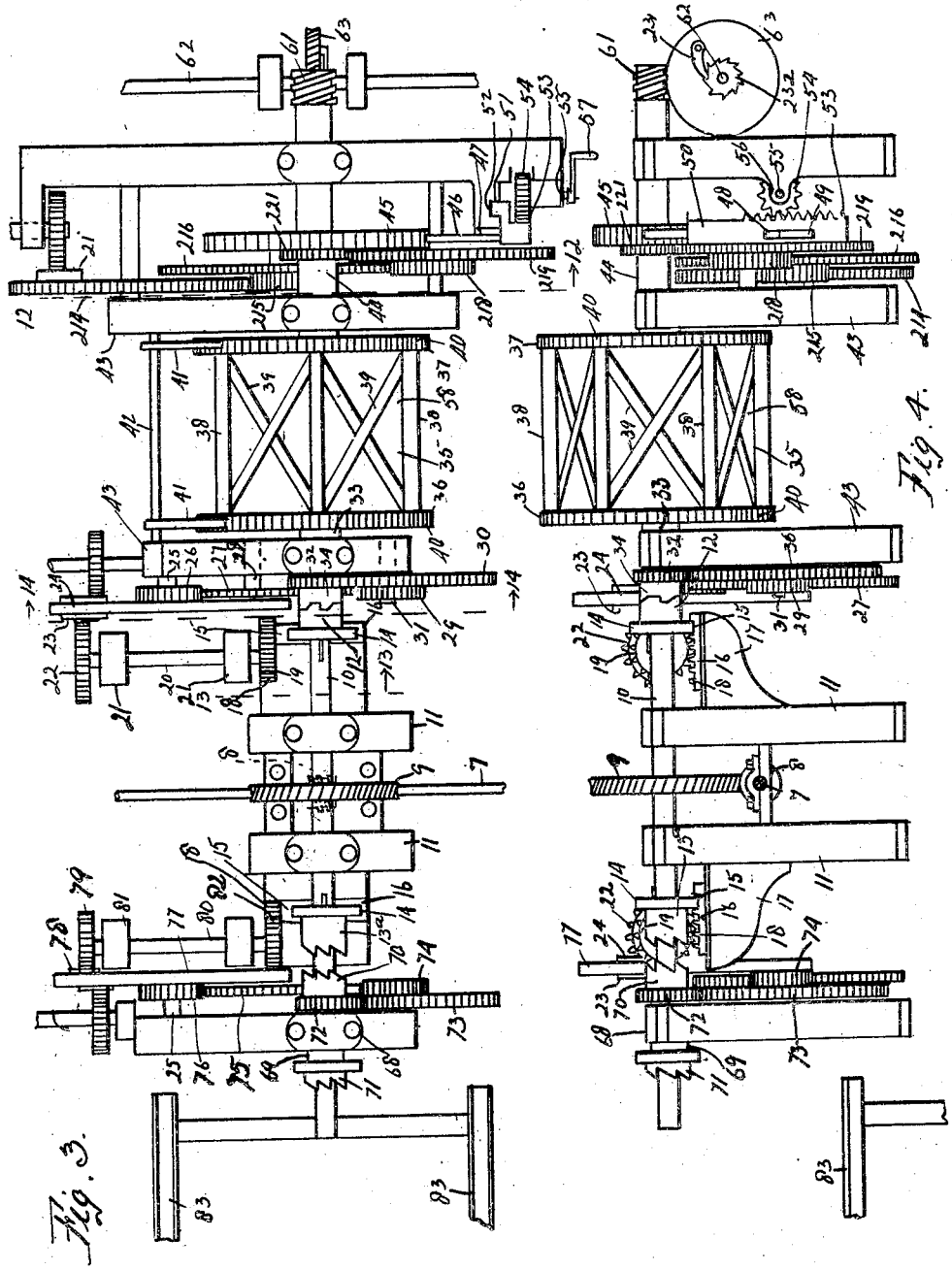

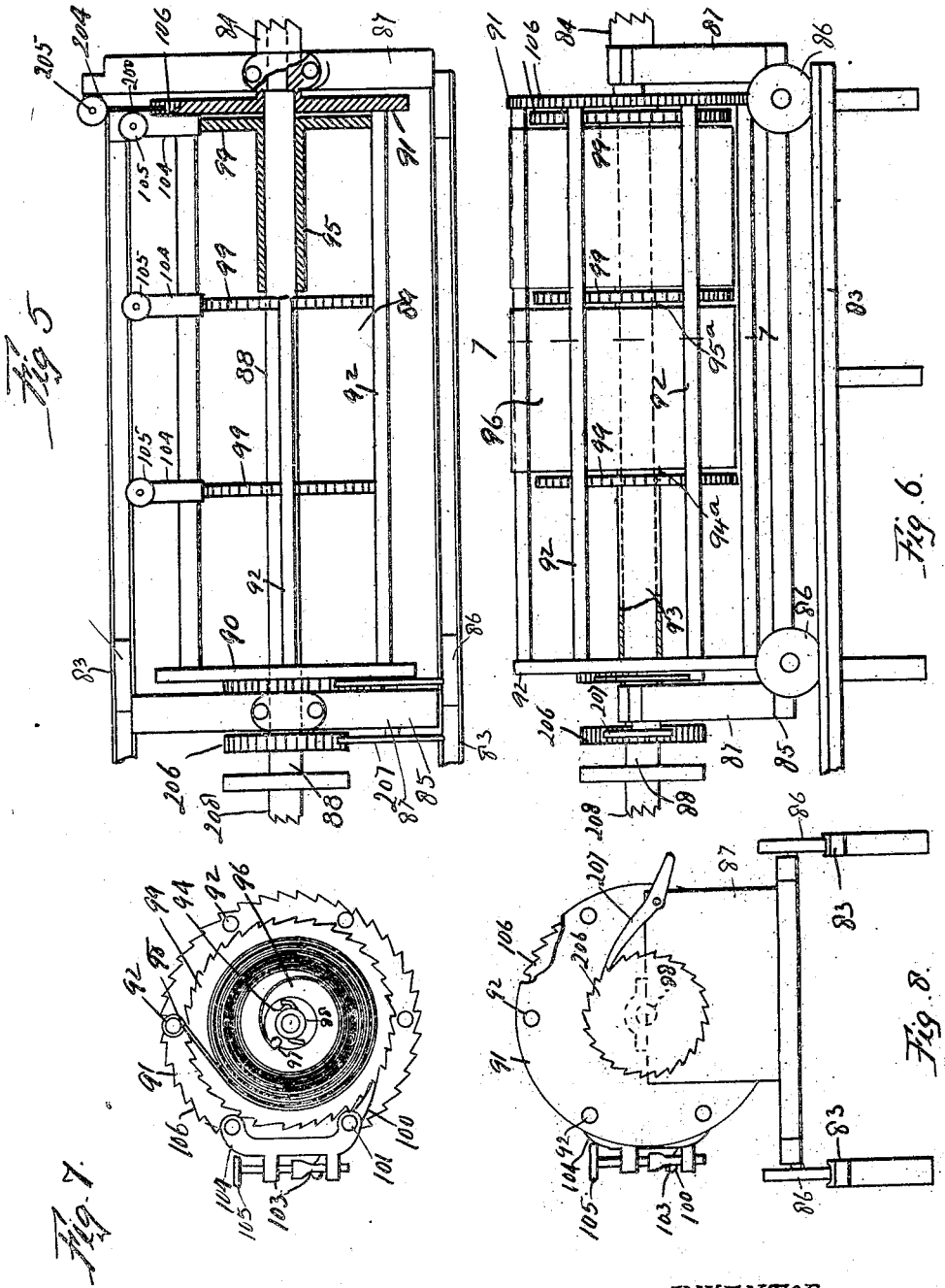

Aug. 26, 1924.
J. TYDINGS
1,506,394
APPARATUS TO MECHANICALLY HARNESS, STORE, AND TRANSMIT POWER
Filed Nov. 15, 1921
7 Sheets-Sheet 5
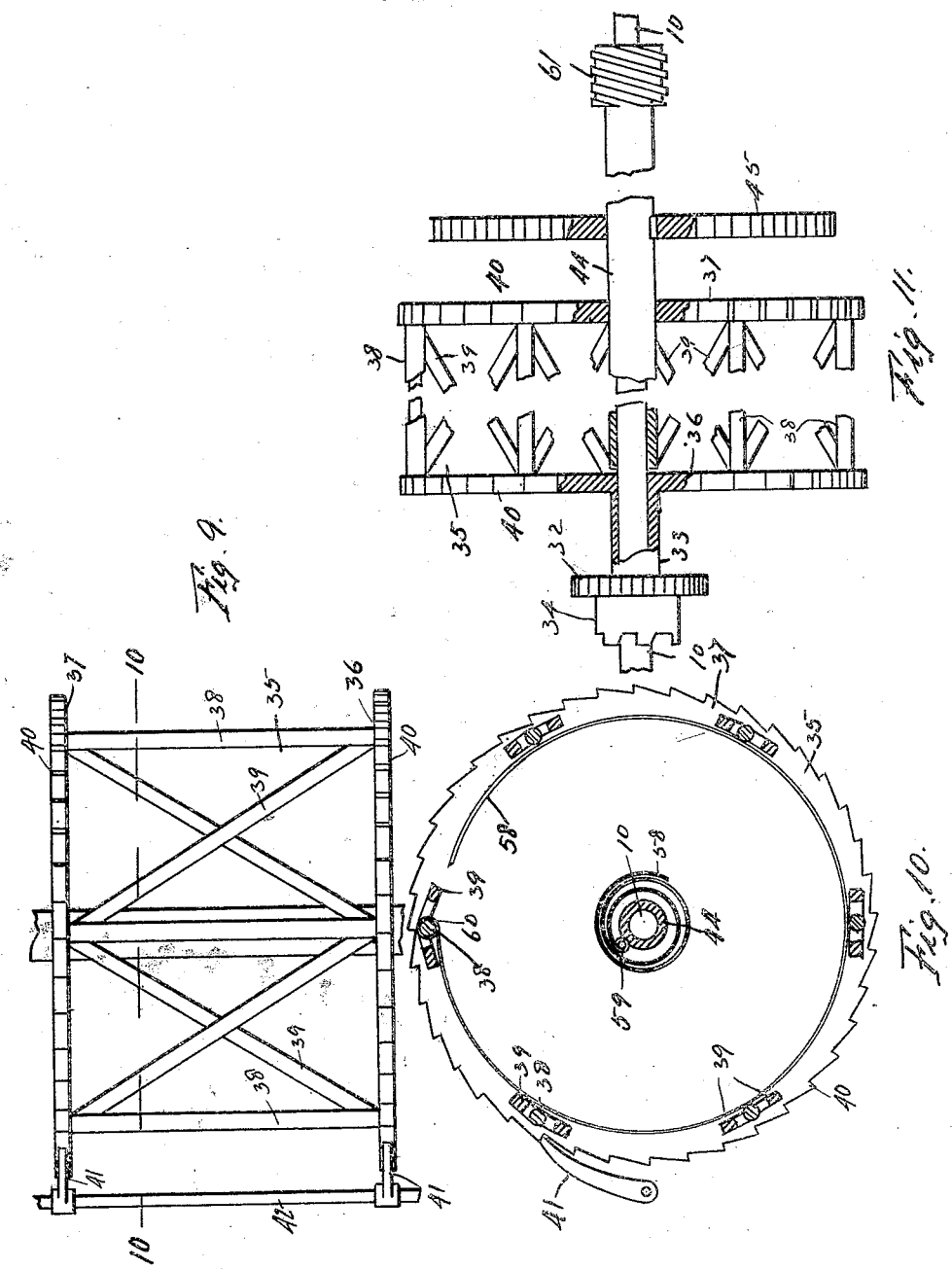
INVENTOR
John Tydings Aug. 26, 1924.   J. TYDINGS   1,506,394
APPARATUS TO MECHANICALLY HARNESS, STORE, AND TRANSMIT POWER
Filed Nov. 15, 1921   7 Sheets-Sheet 6
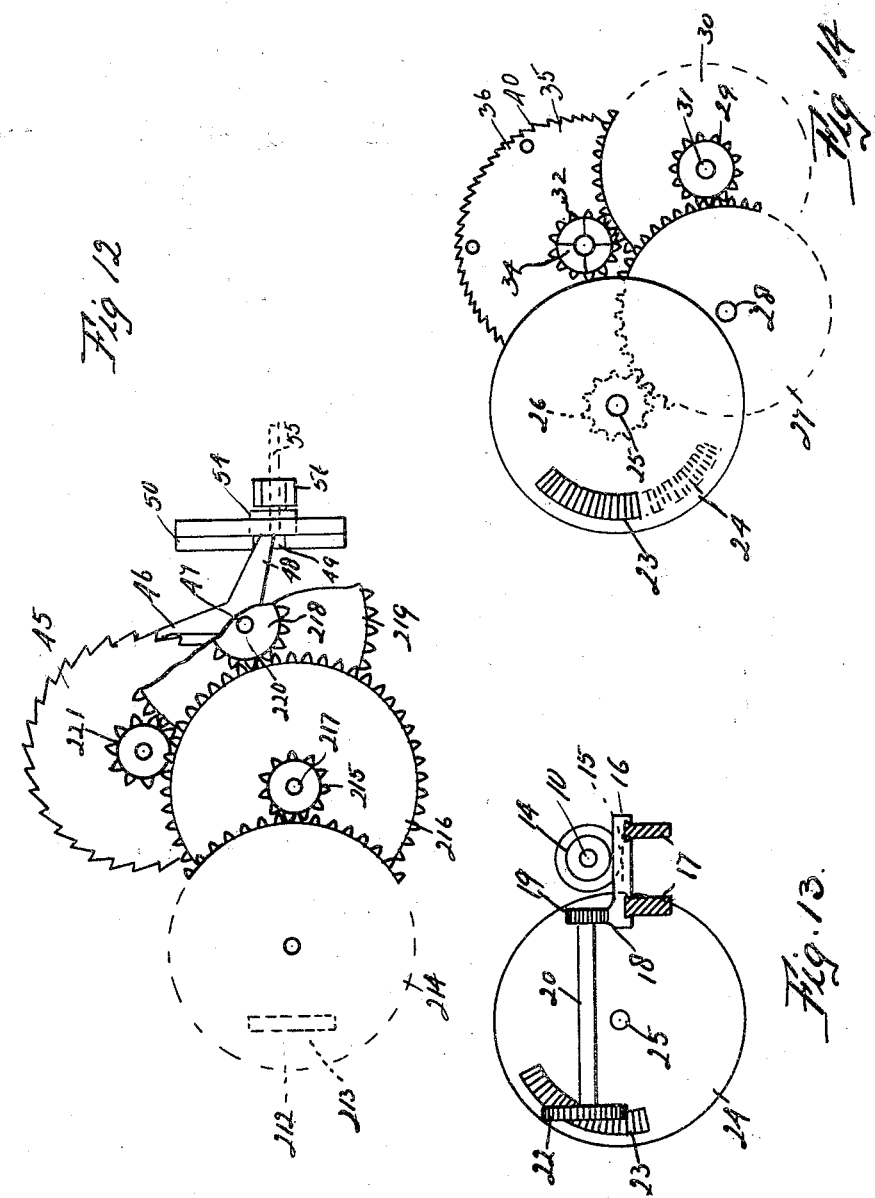
INVENTOR
John Tydings
By W. W. Willi... Atty.

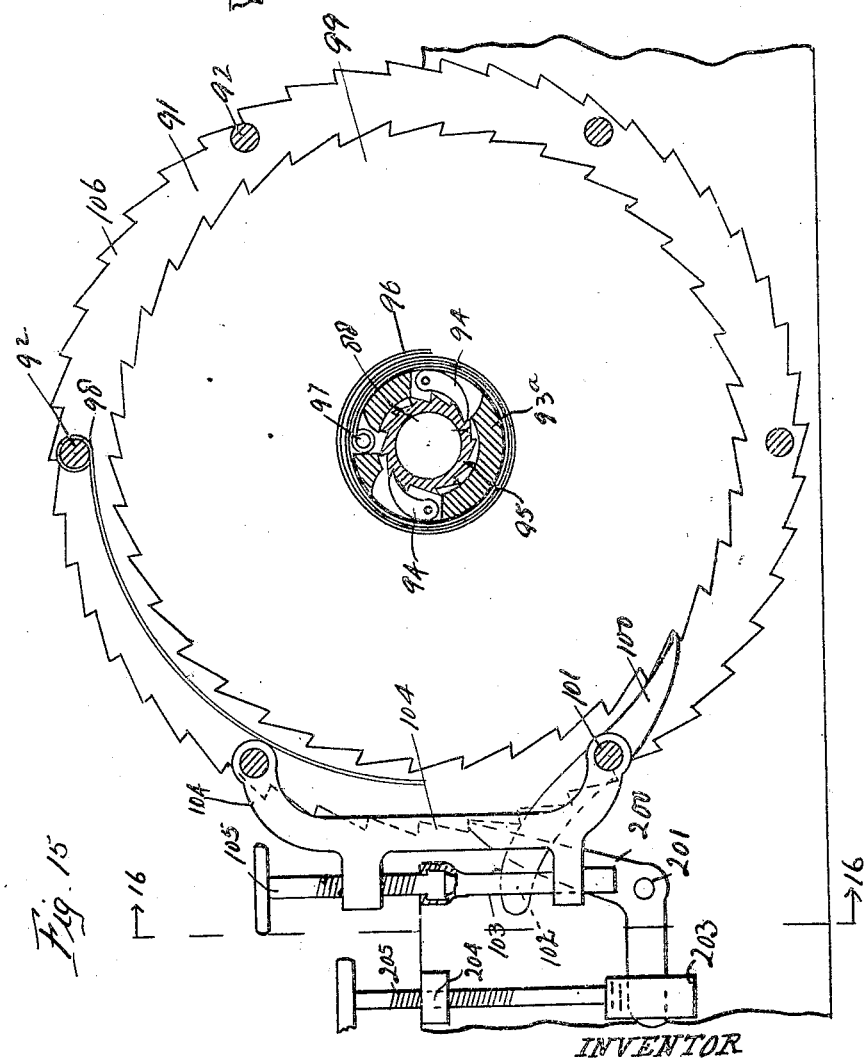

Patented Aug. 26, 1924.

1,506,394

UNITED STATES PATENT OFFICE.

JOHN TYDINGS, OF PHILADELPHIA, PENNSYLVANIA.

APPARATUS TO MECHANICALLY HARNESS, STORE, AND TRANSMIT POWER.

Application filed November 15, 1921. Serial No. 515,329.

*To all whom it may concern:*

Be it known that I, JOHN TYDINGS, a citizen of the United States, residing at Philadelphia, in the county of Philadelphia and State of Pennsylvania, have invented new and useful Improvements in an Apparatus to Mechanically Harness, Store, and Transmit Power, of which the following is a specification.

My invention relates to new and useful improvements in an apparatus to mechanically harness, store and transmit power, and has for its object to provide a device of this character to receive its initial power from a suitable source such as wave or current motors, a windmill or the like and to store this power mechanically by means of a spring or springs and to transmit the power from said spring or springs to a machine or mechanisms such as are ordinarily actuated by electric or steam engines.

Another object of the invention is to provide means for storing power in a number of springs which are successively wound and likewise successively utilized as the preceding one runs down.

Another object of the invention is to provide means for automatically causing a succeeding spring to be wound up or unwound as the preceding one ceases functioning.

Another object of the invention is to provide a portable device having springs mounted thereon which are adapted to be wound by the main mechanism and afterwards transported to a given locality where the power is to be applied.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a fragmentary plan view of two similar adjacent elements of the mechanical power harnessing storage and transmitting apparatus.

Fig. 2, is a similar view of two other elements which are arranged in endwise alignment relative to the elements shown in Fig. 1.

Fig. 3, is a similar view of two of the different elements showing their relation to one another.

Fig. 4, is a side elevation thereof.

Fig. 5, is a plan view of a portable transporting device.

Fig. 6, is a side elevation thereof.

Fig. 7, is a section of the spring arbor on the line 7—7 of Fig. 6.

Fig. 8, is an end view of Fig. 6.

Fig. 9, is a plan view of one of the main spring arbors.

Fig. 10, is a section at the line 10—10 of Fig. 9, with a portion of the spring removed.

Fig. 11, is a side elevation thereof illustrating the construction of its shaft and some of the component parts, portions being broken away and shown in section.

Fig. 12, is an enlarged side elevation of one train of gears taken at approximately the line 12—12 of Fig. 3.

Fig. 13, is a section at the line 13—13 of Fig. 3 to illustrate the construction of the automatic clutch shifting mechanism.

Fig. 14, is a side elevation of a train of gears at the line 14—14 of Fig. 3.

Fig. 15, is an enlarged sectional view through a portion of the portable transporting device somewhat similar to Fig. 7 illustrating the manner of holding the different spring arbors as well as the means for releasing the same a part of the spring being broken away.

Fig. 16, is an edge view of one of the pawl actuating devices with the coacting ratchet at the line 16—16 of Fig. 15.

In carrying out my invention as here embodied, 2 represents a power shaft journalled in suitable bearings 3 and having pulleys 4 thereon whereby power is transmitted to the shaft through some suitable medium from any desirable motor such as, for instance, a wave motor, a current motor or a wind motor and the power developed by said motors is transmitted through suitable shafting and gearing to the springs which thus store the power for future use.

The shaft 2 has a worm 5 thereon meshing with a worm gear 6 mounted on the shaft 7 suitably journalled and provided with a worm 8, Fig. 4, which meshes with a worm gear 9 fixed to the clutch shaft 10 journalled in the bearings 11 and provided at each end with a clutch member 12 and 13$^a$. Both of said clutch members are splined upon the clutch shaft 10 so that they may slide back and forth and in order to actuate them longitudinally of the shaft 10 each clutch member is provided with a collar 14 projecting into a groove 15 in the carriage 16, said carriages being suitably mounted in any suitable and well known manner in brackets 17 forming a part of the bearings 11 the said brackets being plainly illustrated in Fig. 4 and both of said carriages are provided with a rack 18.

The carriage for moving the clutch member 12 backward and forward is actuated by a rack pinion 19 meshing with the rack of said carriage and this pinion is fixed to one end of the shaft 20 journalled in suitable bearings 21 while on the other end of said shaft is mounted another pinion 22 which is in the path of travel of an arcuate rack 23 mounted on one side of the disc 24, said disc being mounted on a shaft 25 with which is connected a pinion 26, Fig. 14, meshing with a gear 27 mounted on a shaft 28 the said gear meshing with a pinion 29 connected with a gear 30 the latter gear and pinion being mounted on the shaft 31 and said gear 30 meshes with the pinion 32 fixed to the spring arbor sleeve 33 which carries a complementary clutch member 34 for cooperation with the clutch member 12.

From the foregoing it will be seen that when the clutch members are in engagement and the sleeve 33 is being revolved, at a predetermined time, determined by the timing of the gear train shown in Fig. 4, the arcuate rack 23 on the disc 24 will mesh with the pinion 22 and rotate the shaft 20 thereby transmitting motion through the pinion 19 and the rack 18 to the carriage 16 for disengaging the clutch member 12 from the complementary clutch member 34 at which time the continued revolving of the clutch shaft 10 will have no effect upon the train of gears or the spring arbor sleeve.

The sleeve 33 is fixed to or formed integral with one of the side discs of the spring drum 35 consisting of two side discs 36 and 37 suitably fastened together by rods 38 or their equivalent and braced with diagonal struts 39 and each of said discs is provided with circumferential ratchet teeth 40 whereby the drum may be held against retrograde movement by the use of a pair of pawls 41 suitably mounted in proximity to the drum it being here shown as fixed to a shaft 42 journalled in some suitable portion of the bearing standards 43. One side of the drum, as 36, is revolubly mounted upon the shaft 10 while the other side 37 is revolubly mounted upon the barrel 44 which latter is revolubly mounted upon the shaft 10 and passes through the side disc 37. On this barrel is fixed a ratchet wheel 45 whereby said barrel may be held stationary during the winding of the spring within the drum, to be later described, by means of a pawl 46 pivoted or journalled at 47 with its arm 48 projecting into a slot 49 formed in the vertical slide 50, said slide being provided with a tongue 51 registering with a groove 52 in some suitable portion of the framework of the machine and said slide also has a rack 53 with which meshes a pinion 54 fixed to a suitable shaft 55 journalled in a bearing 56 said shaft being revoluble in any suitable manner as by a crank 57 where the same is to be manually actuated or by suitable gearing if it is to be automatically actuated, as will be later described.

As shown in Fig. 10 a spring 58 is coiled about the barrel 44 with one end fastened thereto in some suitable or well known manner as at 59 while the outer end is attached to some portion of the drum as, for instance, one of the cross rods as indicated at 60 so that during the time that the clutch member 12 is in engagement with the complementary clutch member 34 the spring drum will be revolved in that direction that will wind up said spring and when the winding operation is completed the arcuate rack 23 on the disc 24 will have engaged the pinion 22 and thereby cause the clutch member 12 to be disengaged from the complementary clutch member so as to discontinue the winding operation.

After the winding operation has been completed and it is desired to utilize the power thus stored in the spring the pawl 46 is disengaged from the ratchet wheel 45 which will then permit the spring to rotate the barrel 44 and transmit its power through the medium of the worm 61 fixed to the barrel 44, to the shaft 62 through the medium of the worm gear 63 fixed on said last named shaft and from this shaft power may be transmitted through a worm 64 thereon and a gear 65 to a power shaft 66 on which said gear is mounted. On the shaft 66 may be mounted any number of pulleys 67 or their equivalent whereby the power may be distributed to machinery located at different desired points.

On the shaft 10 adjacent the clutch member 13 and journalled in a suitable bearing 68 is revolubly mounted a sleeve 69 carrying on one end a complementary clutch member 70 for coaction with the clutch member 13 and on its other end a clutch member 71 whereby a portable spring power storage device may be connected with the main machine for winding the spring as will be hereinafter described.

With the complementary clutch member 70 is connected a pinion 72 meshing with a gear 73 having a pinion 74 connected therewith which meshes with an idler gear 75 in turn meshing with a pinion 76 connected with the disc 77 carrying on one face or side an arcuate rack 78 to mesh with a pinion 79 on one end of the shaft 80, said shaft being journalled in bearings 81 and having on its other end a rack pinion 82 in mesh with the rack 18.

This train of gears is similar to that shown in Fig. 14 so that at the proper predetermined time the rack pinion 82 will be actuated and through it and the rack 18 the carriage 16 will be moved in the proper direction to disengage the clutch member 13 from the complementary clutch member 70.

In the region of the clutch member 71 is a suitable track 83 arranged so that the portable device, shown particularly in Figs. 5 to 8 inclusive, may be brought into operative position relative to the main machine and more particularly to bring the clutch member 84 of said portable device into coaction with the clutch member 71.

The portable power storage device consists of a truck 85 mounted on suitable wheels 86 and this truck includes two standards 87 supporting suitable bearings in one of which is journalled one end of the shaft 88 the other end of said shaft being journalled in a portion of the drum 89 of which the clutch member 84 forms a part. Said drum consists of two side discs 90 and 91, the shaft 88 passing through the disc 91, said side discs having cross bars 92 connected therewith and being braced by suitable struts similar to those bracing the drum shown in Fig. 11.

Within the drum are located a number of arbors, here shown as three in number, and designated by the numerals 93$^a$, 94$^a$ and 95$^a$, but it is to be understood that I am not limited to this particular number as one or more may be utilized. Each arbor is provided with spring actuated pawls 94 for engaging ratchet teeth 95 on the shaft 88 and to each of these arbors is attached one end of a spring 96 as at 97 while the other end of each of said springs is attached to one of the cross rods 92 on the drum as indicated at 98. With each of the arbors is connected a ratchet wheel 99, although one ratchet wheel may be eliminated where a plurality of arbors are used or no ratchet wheel is necessary where only one arbor is used if a ratchet is placed upon the shaft 88 which will be hereinafter described.

With each ratchet 99 coacts a pawl 100 pivoted at 101 with the arm projecting into a slot 102 formed in the slide 103 mounted in a portion of the holder 104 which in turn is mounted upon or fastened to suitable portions of the drum and this slide is actuated in any suitable or well known manner as by a jack screw 105 having threaded connection with some portion of the holder 104 and swiveled to the slide 103.

In order to prevent retrograde movement of the drum during the time the springs 96 are being wound and during the time the power stored within said springs is being transmitted to the shaft 88, I provide ratchet teeth 106 on either of the side discs 90—91 with which coacts a pawl 200 pivoted at 201 with its arm projecting through a slot in a sliding member 203 and to which is swiveled a jack screw 205 having threaded connection with a member 204 carried by or formed as a part of one of the standards of the truck and for all practical purposes is identical with the pawl 100 and its actuating means, except, that it is to be particularly noted that the teeth or the ratchet wheels 99 are set in an opposite direction to those of the drum as plainly illustrated in Fig. 15.

Another ratchet wheel 206 is mounted upon the shaft 88 with its teeth disposed the same as those on the ratchet wheels 99 and this ratchet wheel is held against retrograde movement by a pawl 207 actuated in identically the same manner as the pawl 100 for holding the shaft 88 during the time the springs are being wound or when power is being transmitted thereby and this ratchet wheel and pawl takes the place of one of the ratchets and its pawl on one of the arbors where a number of the latter are used and makes it unnecessary to have any ratchet on the arbor if only one ratchet is used.

When the springs of the portable power storage device are to be wound the said device is brought into proper position relative to the clutch member 71 by running said device upon the track 83 after which the clutch member 13 is moved into engagement with the complementary clutch member 70 at which time power transmitted through the shaft 7, the worm 8 and gear 9 to the shaft 10 will revolve the drum 89 which will wind all of the springs 96 upon their respective arbors, it being understood that said arbors are held stationary by means of the ratchet pawls 94 engaging the ratchets on the shaft 88, while said shaft is held stationary through the medium of the ratchet wheel 206 and pawl 207 and when all of the springs have been wound the pawls 100 are brought into engagement with their respective ratchet wheels 99 to prevent all but one of the springs unwinding and producing the desired power when the pawl 207 is disengaged from its ratchet 206 unless it is desired to utilize more than one of the springs.

All of the springs having been wound the truck may be moved to any desired locality for application of the stored power to any suitable mechanism and if found desirable this truck may be so constructed that a part of the power may be utilized to run it to the desired locality or this truck may be in the form of a tractor and utilized to draw other trucks or devices such as for instance, farming implements.

I have shown in Figs. 5 and 6 the shaft 88 as being provided with a clutch element 208 whereby the same may be connected with a suitable mechanism and when so connected the pawl 207 may be disengaged from its ratchet 206 which will permit one of the springs to unwind from the inside and thus revolve its arbor through the medium of the pawls 94 to transmit power to said shaft 88. During the time the one spring is actuating the shaft said shaft will revolve free of the other arbors, the pawls 94 of said other arbors slipping backward over their respective ratchets as will be obvious and when the power has been completely used from said spring another may be brought into action by releasing the pawl 100 from its respective ratchet wheel 99 thereby permitting the different springs to be successively used.

The foregoing description relates entirely to one section of the machine and these sections may be duplicated or reproduced many times and each section so connected with adjacent sections that as the operation of one section ceases the operations of an adjacent section will be automatically started and in Figs. 1 and 2, I have shown the parts making up two identical sections and hereafter the parts of the other section will be described.

108 is a worm on the shaft 7 meshing with the worm gear 109 on the shaft 110 journalled in suitable bearings 111 and provided with the clutch members 112 and 113 each provided with a collar 114 projecting into a groove 115 in the carriage 116 which are arranged and mounted in the same manner as described for the carriages 16 and each of these last named carriages is provided with a rack 118. With the rack on the carriage for actuating the clutch member 112 meshes a pinion 119 on one end of the shaft 120 journalled in bearings 121 and on the other end of the shaft is a pinion 122 adapted to be engaged at a predetermined time by the arcuate rack 123 on one face or side of the disc 124, said disc forming a part of a train of gears similar to those shown in Fig. 14 and numbered from 124 to 132 inclusive, the pinion 132 forming a part of the clutch 134 and fixed to the sleeve 133 and this sleeve is also fixed to the spring drum 135 consisting of the side discs 136 and 137 the cross rods 138 and struts 139 the side discs having ratchet teeth 140 for coaction with the pawls 141 operatively connected with the shaft 142.

143 are the bearings for the sleeve 133 and the barrel 144 both of which are revolubly mounted upon the shaft 110 and the barrel 144 has a ratchet wheel 145 fixed thereon with which coacts a pawl 146 suitably pivoted as at 147 and having its arm 148 connected with the slide 150 provided with a tongue 151 for registration with the groove 152, the said slide having a rack 153 with which meshes a pinion 154 mounted upon the shaft 155.

In order to actuate the shaft 155 a gear 209 is mounted on the opposite end thereof with which meshes an idle pinion 309 in turn meshing with a gear 210 on a shaft 211, said shaft having another gear 212 on its opposite end which is adapted to be engaged by an arcuate rack 213 on one face of the gear 214 forming a part of that train of gears shown in Fig. 12. The gear 214 meshes with the pinion 215 connected with the gear 216 both mounted on the shaft 217, and said gear 216 meshes with another pinion 218 connected with the gear 219 both of which are mounted on shaft 220 the latter if found desirable, forming the pivot point for the pawl 46. The gear 219 meshes with the pinion 221 connected with the ratchet 45 so that the disengaging of the pawl 46 from the ratchet 45 will cause the aforementioned train of gears to be actuated and these are so timed that when the spring of the drum 35 has about run down the arcuate rack will actuate the gear 212 and thereby transmit motion to the slide 150 and cause the ratchet 146 to be disengaged from the ratchet wheel 145 thus automatically setting the next succeeding power spring which is connected with the drum 135 in operation.

Likewise when the spring connected with the drum 135 has about run down another element will be set in motion through a train of gears including the pinion 222 connected with the ratchet wheel 145 and meshing with the gear 223 having a pinion 224 connected therewith meshing with a gear 225 which also has a pinion 226 connected therewith meshing with a gear 227 carrying an arcuate rack 228 which at a certain predetermined time will coact with the gear 229 on the shaft 230 similar to the shaft 211.

A spring 158 is connected with the drum 135 in the same manner as described in connection with the drum 35 shown in Fig. 10 and the power stored in this spring is transmitted by means of the barrel 144 to the shaft 62 through the medium of a worm 161 and a worm gear 163 and where two sections of the device are thus connected with the single shaft 62 the gears 63 and 163 are each provided with a spring actuated pawl 231 for coaction with a ratchet 232 on the shaft 62 or any other equivalent mechanism may be utilized that will permit the shaft 62 to be revolved by one section of the machine while the other sections are at rest.

This second section of the machine also includes a bearing 168 in which is journalled the sleeve 169 carrying the clutch members 170 and 171 and said clutch member 170 has a pinion 172 connected therewith meshing with the gear 173 carrying a pinion 174 meshing with a gear 175 the latter also meshing with another pinion 176 connected with a disc 177 carrying on one face an arcuate rack 178 to mesh with a pinion 179 on one end of the shaft 180 journalled in suitable bearings 181 and having mounted on its opposite end a rack pinion 182 meshing with the rack 118 to move the clutch member 113 out of engagement with the clutch member 170 at a predetermined time. In a suitable position relative to the clutch member 171 is located a track 183 on which may be run the portable power storage device shown in Figs. 5 to 8 or a duplicate thereof in the same manner as hereinbefore described.

In order that the clutch member 113 may be caused to engage its complementary clutch member 170 at a predetermined time or about the time when the clutch member 13 is disengaged from its complementary clutch member 70 I provide the disc 77 with another arcuate rack 233 on the opposite face or side thereof which is adapted to mesh with the pinion 234 at a predetermined time, on the shaft 235 which also carries a gear 236 meshing with an idle pinion 336 which in turn meshes with a gear 237 on the shaft 238 the latter having a rack pinion 239 thereon in mesh with a rack 240 on the carriage 116 so that when the arcuate rack 233 meshes with the pinion 234 motion will be transmitted to the carriage 116 which will withdraw the clutch member 113 out of engagement with the complementary clutch member 170. The disc 177 of the second section also has an arcuate rack 241 on its opposite face to mesh with a pinion 242 mounted on the shaft 243 which is similar to the pinion and shaft 234 and 235 of the first section so that the same operation will take place in the next succeeding or third section as will be readily understood.

As it is presumed that only one of the springs, as 58, is to be wound at one time and as it is desired to automatically set the parts to wind the second spring after the first spring has been wound and as it is desired to begin winding the second or succeeding spring just prior to the completion of the winding of the first spring I provide another arcuate rack 244 which is mounted on the opposite side of the disc 24 slightly in advance of the arcuate rack 23 and said arcuate rack 244 is adapted to mesh with a pinion 245 on the shaft 246 the latter also carrying a gear 247 meshing with an idle pinion 347 in turn meshing with another gear 248 on the shaft 249, said shaft having mounted thereon a rack pinion 250 meshing with the rack 251 on the carriage 116 which actuates the clutch 114 from which it will be seen that when the disc 24 has reached a position to cause the arcuate rack 244 to mesh with the pinion 245 motion will be transmitted to the carriage 116 which will move the clutch member 112 into engagement with the complementary clutch member 134. Likewise the disc 124 is provided with an arcuate rack 252 on the opposite side thereof slightly in advance of the arcuate rack 123 to mesh with the pinion 253 forming a part of a mechanism similar to that in which the pinion 245 is included for actuating the clutch member of a third or succeeding section of the machine.

In order to harness power derived from fluid current motors the shaft 2 of the above described apparatus is coupled to the power shaft of the motor being used.

Of course I do not wish to be limited to the exact details of construction as herein shown as these may be varied within the limits of the appended claims without departing from the spirit of my invention.

Having thus fully described my invention, what I claim as new and useful is:—

1. In an apparatus of the class described, the combination of two independent spring arbors, a spring drum mounted to revolve about each of said arbors, a spring connected with each of said arbors and each drum, means to revolve either of said drums independently for winding the spring thereof, means to prevent retrograde movement of said drum, means to hold each arbor in a stationary position, means to manually actuate one of the arbor holding means and other means to automatically actuate the other arbor holding means so timed as to release the last named arbor holding means when the spring connected with the arbor with which the first named arbor holding means coacts has spent its power.

2. In an apparatus of the class described, the combination of two independent spring arbors, a spring drum mounted to revolve about each of said arbors, a spring connected with each of said arbors and each drum, means to revolve either of said drums independently for winding the spring thereof, means to prevent retrograde movement of said drum, means to hold each arbor in a stationary position, means to manually actuate one of the arbor holding means, other means to automatically actuate the other arbor holding means so timed as to release the last named arbor holding means when the spring connected with the arbor with which the first named arbor holding means coacts has spent its power, a shaft, means for transmitting motion from each of the arbors to said shaft, and means forming a part of said last named means to permit said shaft to revolve independently of one arbor when the other is transmitting power to said shaft.

3. In an apparatus of the character stated, a spring drum, a clutch member connected therewith, a shaft, a complementary clutch member rotatable with said shaft and slidable thereon whereby it may be moved into and out of engagement with the first named clutch member, a sliding carriage connected with the complementary clutch member, a rack on said carriage, and means controlled by the rotation of the drum including an element coacting with the rack whereby said carriage will be moved at a predetermined time to disengage the complementary clutch member from the other clutch member.

4. In a device of the character stated, the combination of a plurality of drums and their arbors having springs connected therewith, a clutch member connected to and rotatable with each of said drums, a complementary clutch member for coaction with each of said first mentioned clutch members, a sliding carriage connected with each of said complementary clutch members, means for moving said carriages in a direction to disengage the complementary clutch members from their respective coacting clutch members, said means including a rack on each carriage, a pinion meshing therewith, a shaft on which said pinion is mounted, another pinion mounted on the opposite end of said shaft, and a train of gears including a disc having an arcuate rack on one face thereof for coaction with the last named pinion at a predetermined time, said train of gears being actuated by the rotation of the drums, means for moving certain of the carriages in the opposite direction automatically, said means consisting of another rack on certain of said carriages, a pinion meshing with each of said racks, a shaft on which the pinion is mounted, a gear on the opposite end thereof, another gear meshing with said last named gear, a shaft on which said gear is mounted, a pinion on said last named shaft, and an arcuate rack mounted on the opposite side of the above mentioned disc in advance of the other rack thereon to mesh with the last named pinion to move the succeeding carriage inward when the preceding one is moved outward.

5. In combination, a shaft, a sleeve mounted thereon and having a clutch member at each end thereof, another clutch member slidably mounted on said shaft and adapted to rotate therewith, means controlled by the rotation of said sleeve to move the last mentioned clutch member out of engagement with its coacting clutch member, a portable storage device including a spring drum, an arbor, and a spring attached to said drum and arbor, and another clutch member on said arbor adapted to be moved into engagement with one of the clutch members on the sleeve.

6. In a device of this class, a portable power storage device consisting of a truck, a shaft journalled on said truck, a drum arranged to rotate about said shaft, a plurality of arbors within said drum and rotatable about said shaft, means for ratcheting said arbors on said shaft, means for preventing retrograde movement of the arbors, a spring attached to each of said arbors and to a portion of the drum, means to revolve said drum for winding up the spring, and means to prevent retrograde movement of said drum.

7. In an apparatus to mechanically harness, store and transmit power, the combination of a shaft adapted to receive power derived from a motor actuated by certain elements of the universe, a plurality of other shafts arranged crosswise of the first named shaft and adapted to receive their motion from said first named shaft, spring drums rotatable about said shafts, arbors also rotatable about said shafts located axially of said drums, springs connected with said arbors and drums and adapted to be wound by the rotation of said drums, means for preventing retrograde movement of said drums, means to hold the arbors stationary during the winding of the springs, means for transmitting motion from said springs through the medium of their arbors when the latter are released, means to automatically release the arbor of each succeeding spring at or about the time the preceding spring has spent its power, means for rotatably connecting each drum to the cross shaft on which it is mounted, means to disconnect each drum at the completion of the winding of the spring, means to automatically connect the next succeeding drum to its respective shaft at the time the preceding one is disconnected from its respective shaft, portable power storage devices adapted to be moved into juxtaposition to the cross shafts, said portable power storage devices including a drum, a plurality of arbors and a plurality of springs one of which is connected with each of said arbors and to the drum, means to rotatably connect the drum of each portable device with one of the cross shafts whereby said drum will be rotated to wind its spring, means controlled by the rotation of said drum to disconnect said drum from the shaft at a predetermined time, and means to automatically rotatably connect the drum of the succeeding portable power storage device at about the time the preceding one is disconnected from its shaft.

In testimony whereof, I have hereunto affixed my signature.

JOHN TYDINGS.